Jan. 16, 1940.   W. L. BAXTER   2,187,511
FOOD MOLDING MACHINE
Filed June 7, 1938   3 Sheets-Sheet 1

Inventor
WILLIAM L. BAXTER
By Albert G. Blodgett
Attorney

Jan. 16, 1940.  W. L. BAXTER  2,187,511
FOOD MOLDING MACHINE
Filed June 7, 1938  3 Sheets-Sheet 2

Inventor
WILLIAM L. BAXTER
By Albert G. Blodgett
Attorney

Jan. 16, 1940. W. L. BAXTER 2,187,511
FOOD MOLDING MACHINE
Filed June 7, 1938 3 Sheets-Sheet 3
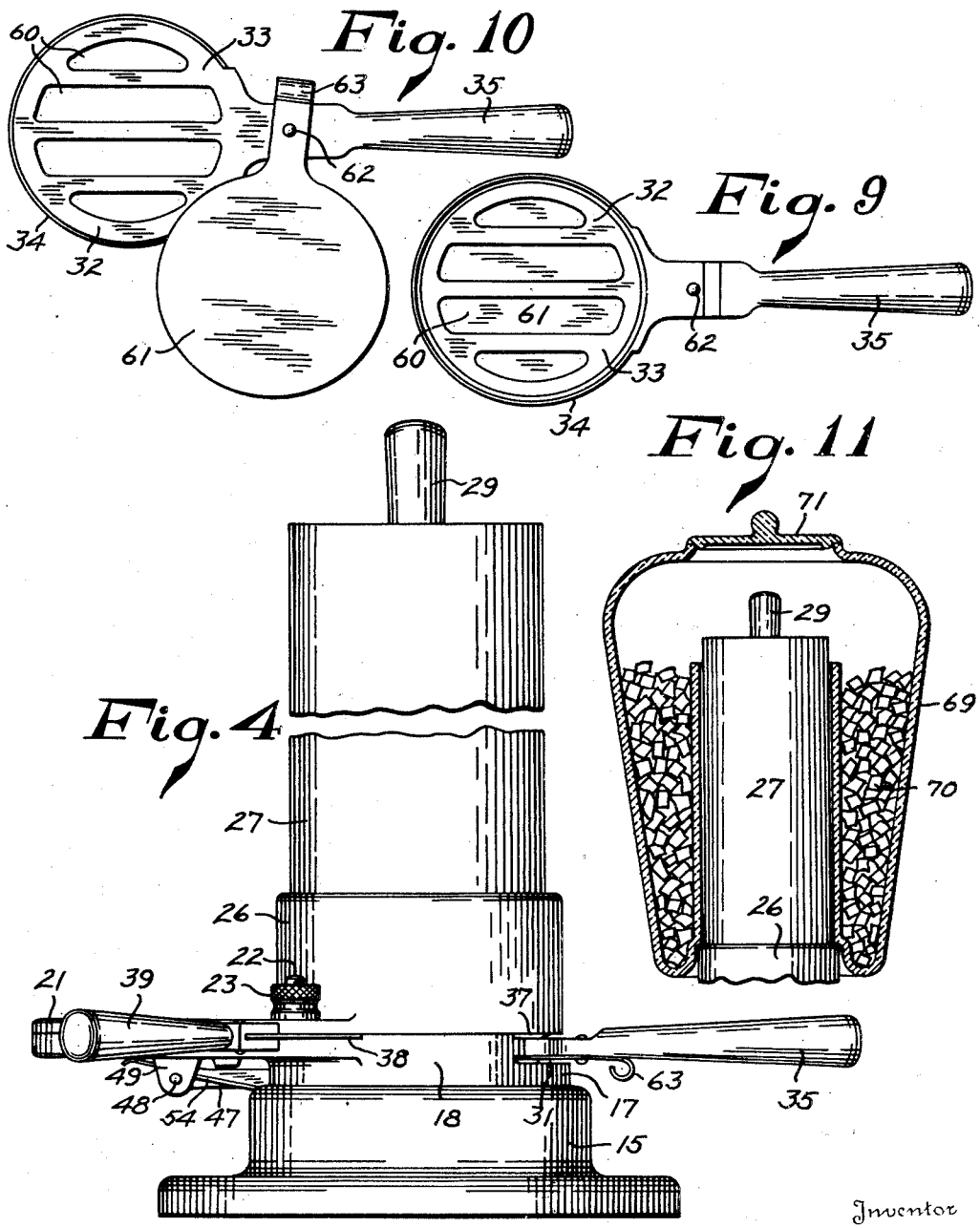
Inventor
WILLIAM L. BAXTER
By Albert G. Blodgett
Attorney Patented Jan. 16, 1940

2,187,511

UNITED STATES PATENT OFFICE 2,187,511

FOOD MOLDING MACHINE

William L. Baxter, Marblehead, Mass., assignor to The Sweeper-Vac Company, Worcester, Mass., a corporation of Massachusetts Application June 7, 1938, Serial No. 212,325

3 Claims. (Cl. 107—8)

This invention relates to food molding machines, and more particularly to machines for molding and dispensing hamburger steak and similar comminuted foods in the form of cakes or patties.

Machines heretofore proposed for this purpose have been unsatisfactory in several respects. In some cases it has been found impossible to produce patties of uniform size and shape, and in other cases it has been difficult to remove the patties from the machine and to transfer them for the cooking operation. Some prior machines have been complicated and expensive, and inconvenient to disassemble for cleaning purposes. In general, no provision has been made for adjusting the thickness of the patties formed by the machines.

It is accordingly one object of the invention to provide a comparatively simple and inexpensive machine which will mold hamburger steak and the like into patties of uniform size and shape.

It is a further object of the invention to provide a food molding machine so constructed and arranged that the patties can be easily and conveniently removed therefrom and transferred for the cooking operation.

It is a further object of the invention to provide a food molding machine which can be easily and quickly disassembled for cleaning purposes.

It is a further object of the invention to provide a food molding machine having a simple means for adjusting the thickness of the patties formed thereby.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a vertical section through a food molding machine, the section being taken on the line 1—1 of Fig. 2;

Fig. 4 is a front elevation of the machine;

Fig. 5 is a top plan view of the base of the machine, shown on a reduced scale;

Fig. 6 is a perspective view of an adjusting shim;

Fig. 7 is an end view of the knife;

Fig. 8 is a perspective view of the knife locking lever;

Fig. 9 is a top plan view of the mold pan;

Fig. 10 is a view of the mold pan turned over, with the valve plate swung to its open position;

Fig. 11 is a vertical section showing an icing device applied to the machine; and Fig. 12 is a fragmentary vertical section showing a device applied to the top of the machine to facilitate disassembly thereof.

Figure 2:
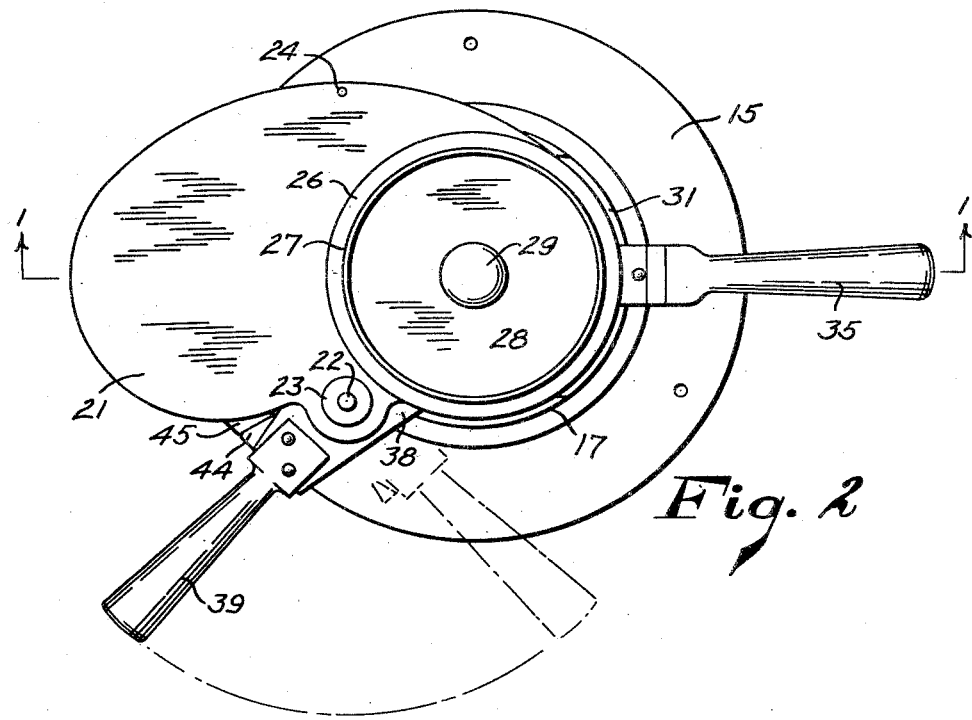
Fig. 2 is a top plan view of the machine.
Figure 3:
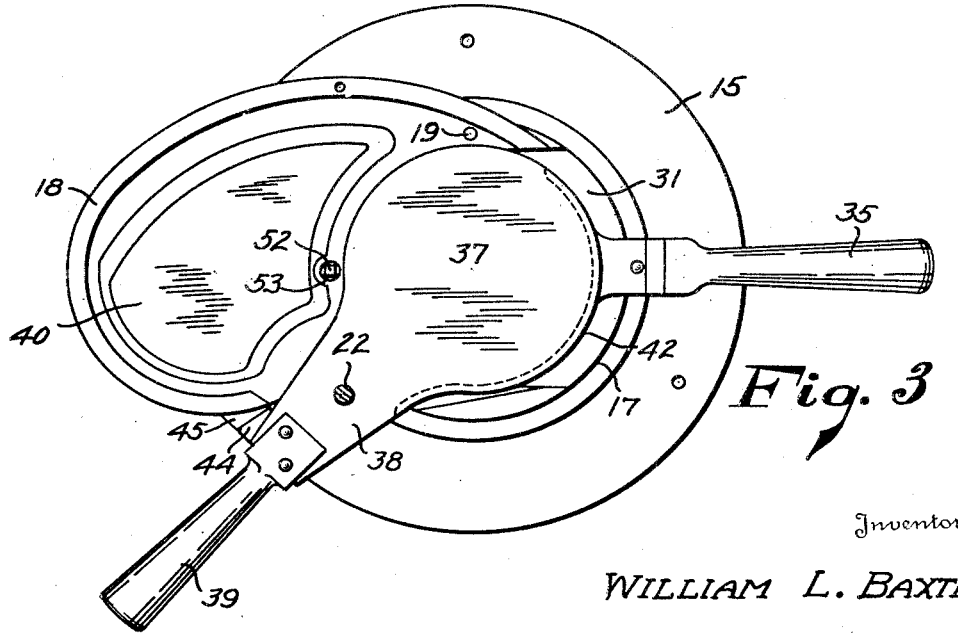
Fig. 3 is a section on the line 3—3 of Fig. 1.

The embodiment illustrated comprises a base 15 which may be secured to a suitable bench or table (not shown). The upper portion 16 of the base is shaped as a short vertical cylinder which is surrounded by an annular portion 17 of a housing 18. A dowel pin 19 (Fig. 3) prevents the housing from turning on the base, while allowing the housing to be readily lifted from the base when desired. A cover 21 is mounted on the housing 18, and in order to fasten these parts together the housing is provided with a stud 22 which extends upwardly through a hole in the cover, a knurled nut 23 being screw-threaded to the upper end of the stud. In addition, a dowel pin 24 (Fig. 2) is mounted in the cover and extends downwardly into a hole in the housing.

Figure 1:
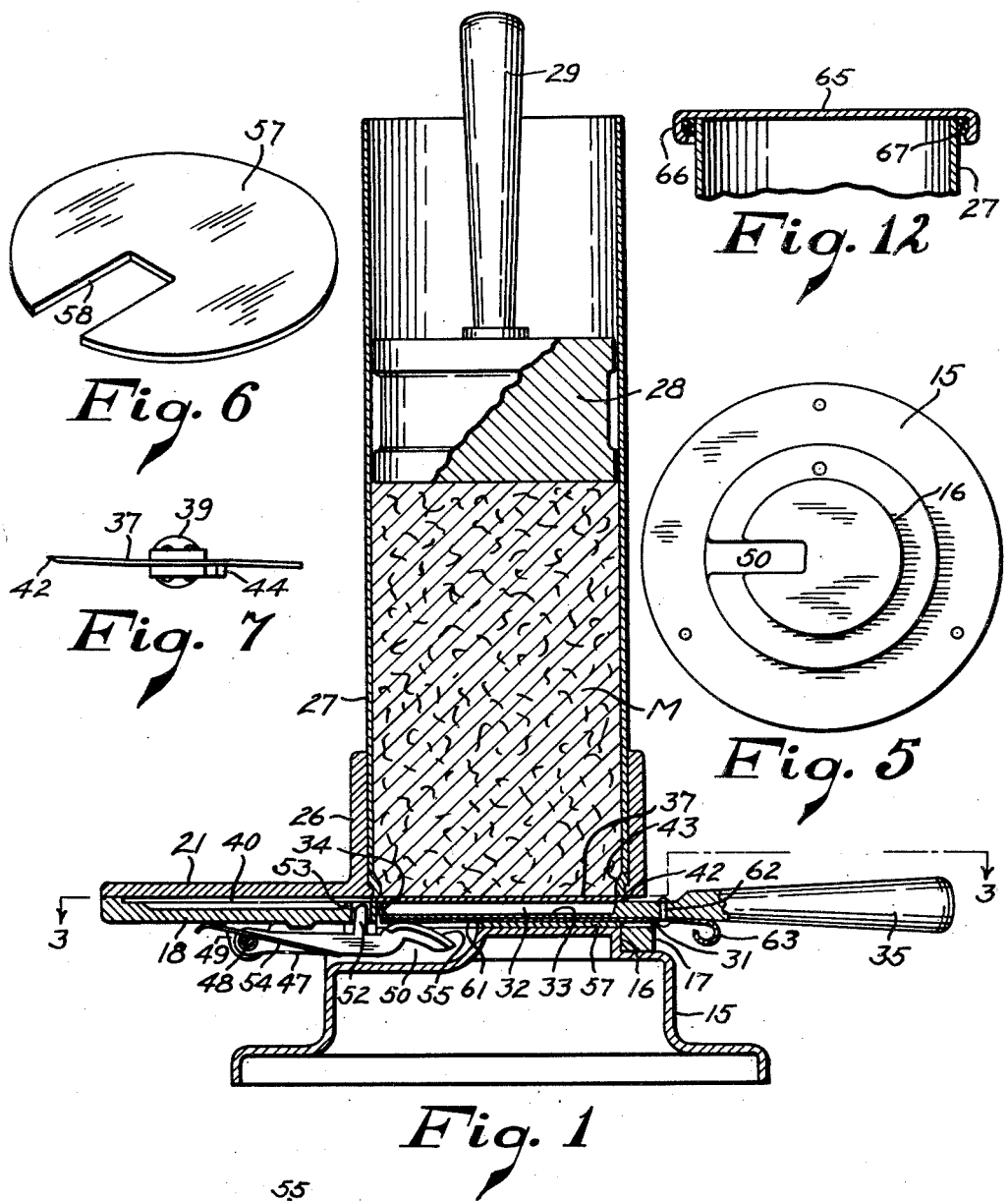

The cover 21 is formed with an integral upwardly extending annular flange 26 which is substantially coaxial with the cylindrical portion 16 of the base 15 therebeneath. This flange 26 encloses and supports the lower portion of a vertical cylindrical tube 27 which forms a container for a supply of ground meat M (Fig. 1). A comparatively heavy weight or plunger 28 fits closely within the tube and rests upon the meat to urge the same downwardly. This weight is preferably provided with an upwardly extending handle 29. The tube 27 is readily removable from the flange 26.

The housing 18 and the cover 21 are shaped to provide a recess 31 between the cylindrical portion 16 of the base and the lower end of the tube 27 thereabove. This recess is open at one side so that an open-top mold 32 may be inserted therein to receive meat from the tube and form this meat into patties of the desired shape. The mold illustrated comprises a flat circular bottom wall 33, a marginal flange 34 extending upwardly therefrom, and a radially extending handle 35.

In order to prevent the meat from entering the recess 31 when the mold 32 is removed therefrom, I provide a valve 37 in the form of a thin horizontal plate approximately circular in shape located between the housing 18 and the cover 21, and adapted to close the bottom of the tube 27. This plate 37 is provided with a radial extension 38 having an opening therethrough for the stud 22 so that the plate may swing about the stud in a horizontal plane. An operating handle 39 is secured to the extension 38. The housing 18 and cover 21 are shaped to provide a lateral chamber 40 (Fig. 1) into which the plate 37 may be swung to allow free discharge of the meat from the tube 27 into the mold 32. The plate 37 is beveled to provide a sharp edge 42 along one side, and this edge is arranged to cooperate with a ring 43 (Fig. 1) of comparatively hard material, such as steel, mounted in the cover 21 directly beneath the lower end of the tube 27. With this construction the ring 43 forms the actual discharge opening of the container. As shown in Fig. 7, the valve plate 37 is preferably bent slightly out of a true plane, so that when the parts are assembled the sharp edge 42 will be held upwardly against the bottom of the ring 43 with a slight resilient pressure, thereby ensuring a proper shearing action. The knife handle 39 is preferably provided with a lug 44 which is arranged to engage a boss 45 on the housing 18 and thus limit the movement of the knife and prevent damage to the cutting edge 42 thereof.

If through carelessness the knife 37 should be withdrawn into the chamber 40 when the mold 32 was not in the recess 31, the recess would be filled with meat and the entire machine would have to be taken apart to clean it out. To avoid this possibility I have shown a horizontal lever 47 pivoted at its outer end on a horizontal pin 48 carried by a pair of spaced lugs 49 extending downwardly from the housing 18. The inner portion of this lever is located in a recess 50 in the base 15. The lever 47 is provided with a lug 52 which extends upwardly therefrom through an opening 53 in the housing 18. A spring 54 urges the lever upwardly so that the lug 52 may prevent withdrawal of the knife 37. The inner end of the lever is formed with a curved cam surface 5 so shaped and located that upon insertion of the mold pan 32 in the recess 31 the bottom of the pan will engage the surface 55 and force the lever downwardly, removing the lug 52 from the path of the knife.

In some cases it may be desirable to provide means for varying the thickness of the patties formed by the machine. For this purpose I may provide means to adjust the height of the mold pan 32 relative to the plane of movement of the knife 37. In the drawings I have shown a shim 57 inserted between the base 15 and the mold pan, this shim being formed as a circular plate having a radial notch 58 therein (Fig. 6) to avoid interference with the lever 47. By utilizing shims of various thicknesses the thickness of the patties can be varied as desired.

After a meat patty has been formed in the mold 32, the mold will be withdrawn from the machine and inverted to discharge the patty, usually into a frying pan. In order to facilitate such discharge the bottom wall 33 of the mold is preferably provided with a series of slots or openings 60 (Figs. 9 and 10) which may be closed by a flat plate 61 forming a valve device. This plate is pivotally secured to the handle 35 of the mold by means of a rivet 62, a portion 63 of the plate being bent over so that it may be engaged by the thumb of the operator. After the mold has been inverted, the atmospheric pressure will often prevent discharge of the patty, but by swinging the plate 61 laterally as shown in Fig. 10, the slots 60 will be opened to allow air to pass through, and the patty will be released.

In order that the tube 27 may be withdrawn from the machine without first emptying the meat from the tube, I have provided the device shown in Fig. 12. This device comprises a cap 65 having a downwardly extending annular flange 66 within which is mounted an annular gasket 67 of rubber or other suitable material. This cap 65 is arranged to fit over the top of the tube 27, upon removal of the weight 28, and provide an airtight seal for the tube. With this cap in place the tube can be removed from the machine with the meat held in the tube by atmospheric pressure.

In Fig. 11 I have shown a means for cooling the meat to prevent deterioration thereof. This comprises an annular receptacle 69, which may be of glass or any other suitable material, this receptacle surrounding the tube 27 and containing ice 70 to cool the meat therein. A removable cover 71 is provided at the top of the receptacle.

The operation of the invention will now be apparent from the above disclosure. With the knife 37 in the closed position, as shown in Fig. 1, the tube 27 is filled with ground meat M and the weight 28 is placed on the top of the meat. The mold pan 32 is then inserted in the recess 31. This will depress the lever 47 and remove the lug 52 from the path of the knife. The handle 39 will then be actuated to swing the knife into the chamber 40, whereupon the weight 28 will force the meat M downwardly, filling the mold 32. The knife will then be returned to the closed position, the sharp edge 42 thereof cooperating with the ring 43 to sever the meat in the mold from the meat in the tube 27. The mold 32 can then be withdrawn with the meat patty therein, and the spring 54 will immediately elevate the lever 47 and lock the knife in its closed position. The mold 32 may then be inverted and the plate 61 swung laterally, as shown in Fig. 10, to allow discharge of the patty into a frying pan. By utilizing the cap 65, as shown in Fig. 12, the tube 27 can be withdrawn from the machine without removing the meat from the tube. The entire machine can be easily disassembled for cleaning after removing the knurled nut 23. The ice receptacle 69 shown in Fig. 11 provides a simple and convenient means for cooling the meat and thus preserving the same. The thickness of the patties can be readily adjusted by using shims 57 of different thicknesses.

Having thus described my invention, what I claim as new and desire to secure by Letters Patent is:

1. A molding machine for ground meat and the like comprising a supporting structure shaped to provide a recess, a mold removably mounted in the recess, a container mounted on the supporting structure adjacent to the mold and formed with a discharge opening through which ground meat is supplied to the mold, a knife arranged to sever the meat between the container and the mold while the mold is in the recess, the knife being shaped to close the discharge opening in the container after the meat has been thus severed and thereby prevent the meat in the container from passing into the recess when the mold is removed, and a locking device arranged to retain the knife in its closed position, the locking device being releasable by the mold upon insertion of the mold in the recess.

2. A molding machine for ground meat and the like comprising a base, a housing mounted on the base and arranged to provide a recess for the lateral insertion of an open-top mold, a cover mounted on the housing and having an upwardly extending annular flange, an upright tube supported in said flange and forming a container from which ground meat may be discharged downwardly into the mold therebeneath, and a knife movable horizontally across the bottom of the tube to sever the meat therein from the meat in the mold while the mold is in the recess, the knife being shaped to close the bottom of the tube after the meat has been thus severed, the housing and cover being arranged to provide a chamber into which the knife may be withdrawn laterally to allow the filling of the mold.

3. A molding machine for ground meat and the like comprising a supporting structure shaped to provide a recess, an open-top mold removably mounted in the recess, a container mounted on the supporting structure directly above the mold and arranged to supply ground meat thereto, a knife movable in a substantially horizontal plane across the bottom of the container to sever the meat in the mold from the meat in the container while the mold is in the recess, the knife being shaped to close the bottom of the container after the meat has been thus severed and thereby prevent the meat in the container from falling into the recess when the mold is removed, and means to adjust the height of the mold relative to the plane of movement of the knife and thereby control the thickness of the patties produced by the machine.

WILLIAM L. BAXTER.